Figure 1:
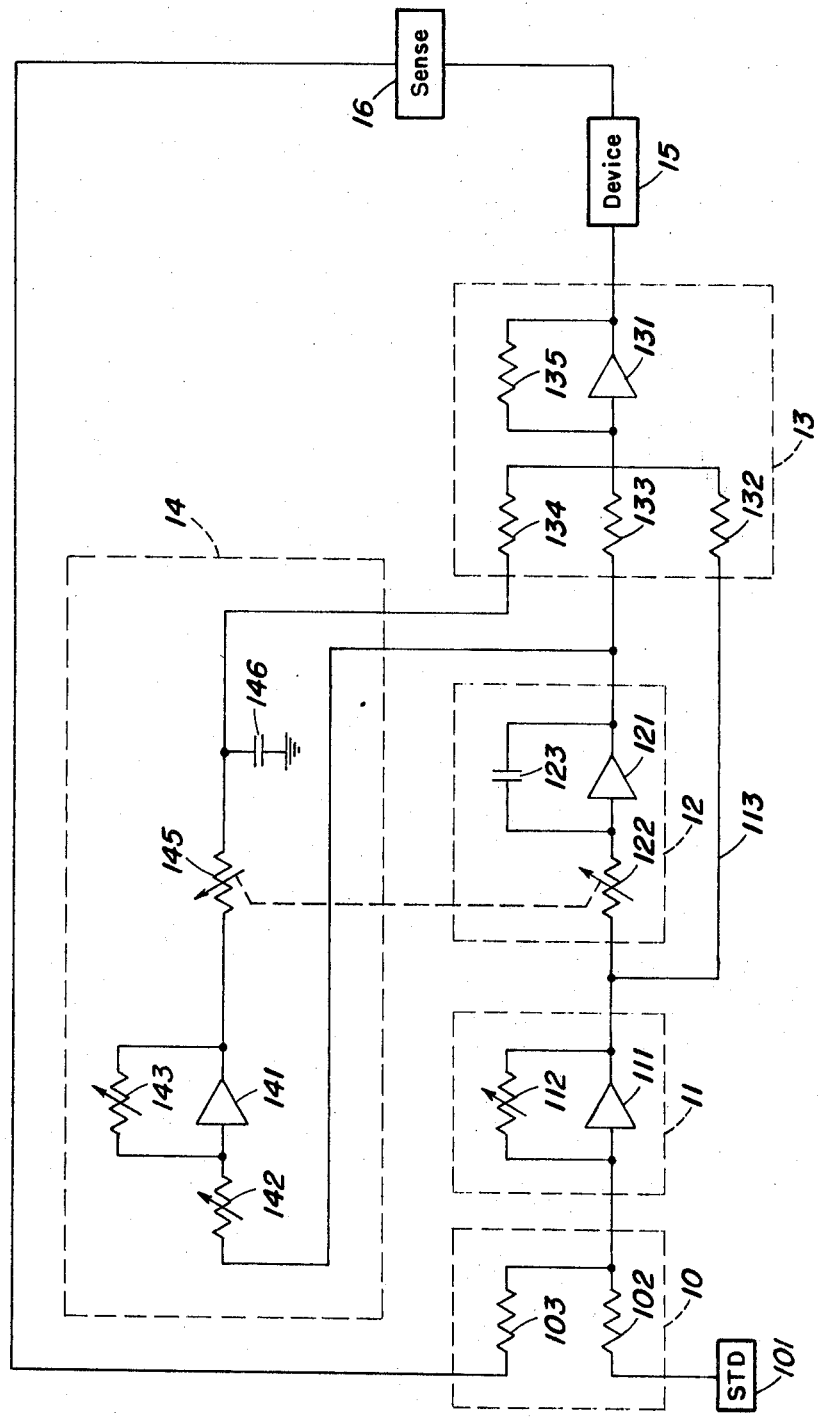

United States Patent [19]
O'Connor et al.

[11] 3,727,036
[45] Apr. 10, 1973

[54] CONTROL STABILIZING TECHNIQUES

[75] Inventors: Ward F. O'Connor, Denville, N.J.; Van Vliet, Greenwich, Conn.

[73] Assignee: The Lummus Company, Bloomfield, N.J.

[22] Filed: Sept. 23, 1971

[21] Appl. No.: 183,089

[52] U.S. Cl. ............................. 235/150.1, 318/609
[51] Int. Cl. ................................. G05b 11/42
[58] Field of Search ............ 235/150.1; 318/609, 318/610, 611, 620, 621

[56] References Cited

UNITED STATES PATENTS 2,946,943   7/1960   Nye et al. ..................... 318/610 X

Primary Examiner—Eugene G. Botz
Attorney—Marn & Jangarathis

[57] ABSTRACT

A method of and apparatus for reducing the fluctuations in the operation of a device are disclosed in accordance with the teachings of the present invention wherein said device is regulated by a control signal in accordance with a desired standard of performance. The control signal is produced by combining a first signal that is proportional to an error signal characterizing the performance of said device, with a second signal that is proportional to the integral of said error signal and a third signal that is proportional to the inverse of said second signal and having a time delay with respect to said second signal. The third signal is produced by inverting said second signal and adding a time delay thereto.

13 Claims, 4 Drawing Figures

CONTROL STABILIZING TECHNIQUES

This invention relates to techniques for regulating the operation of a device and more particularly, to a method of and apparatus for rapidly stabilizing the operation of a device wherein said device operates on a process variable in accordance with a predetermined standard of performance.

Automatic control systems are well known in the prior art for regulating the operation of a device. The device may appropriate several conventional forms such as a signal amplifier, a phase shift system, an electric motor, a chemical processing plant and various other well-known devices adapted to have the operation thereof adjusted for external and internal disturbances and device load variations. Conventional automatic control systems are generally categorized as feed forward control systems or feedback control systems. Although feed forward control systems are inherently stable in their operation, these systems usually require the precise detection of all disturbances that might affect the operation of the device controlled including internal and external disturbances and load variations. Furthermore, it is necessary that the operation of the device, its response to changes in a manipulatable variable, the time delay in responding to control signals and other critical factors be accurately known and capable of absolute prediction. Satisfying these limitations has impeded the general acceptance of feed forward control systems. Accordingly, most control techniques that are presently utilized incorporate feedback control systems.

Prior art feedback control systems include detecting means for detecting the actual operation of the device, error means for determining a difference between the actual operation of the device and a predetermined standard of performance and regulating means for adjusting a manipulatable variable in accordance with said determined difference to affect the operation of the device. A simple feedback control system has only a single mode of operation, commonly known as the proportional mode, which adjusts the performance of the device in a manner proportional to the difference between the actual operation and a desired operation thereof. In order to maintain precise control of the device however, the proportional mode requires that a minimum difference between actual and desired operation must always be present.

More efficient feedback control systems additionally include a reset or integral mode of operation. The reset mode does not require the continuous presence of a minimum difference but, rather, continuously amplifies the aforementioned difference with the passage of time until said difference is reduced to zero. Un Unfortunately, the inherent frequency dependent characteristics exhibited by the reset mode introduces time delays in the feedback control loop thereby causing the actual operation of the device to oscillate about the predetermined standard of performance. In other words, the transient response of the feedback control loop is subject to fluctuations which delay the steady state stabilization of the actual operation of the device at the desired value when the aforementioned different is equal to zero. This instability characterized by the reset mode may be compensated by further including a rate mode of operation in the feedback control system.

The rate mode operation controls the performance of the device in accordance with the rate of change of the difference between actual and desired operation. Accordingly, the rate mode introduces a leading factor into the time of response of the control loop which advantageously counteracts the time delay introduced by the reset mode. However, the frequency response characteristics of typical rate mode components are such as to amplify undesirable noise thereby introducing errors in the feedback control loop. In addition, most feedback control systems including rate mode operation require precise adjustment of the operating characteristics of the rate mode component in an effort to match the characteristics thereof to the characteristics of the control device whereby optimum regulation of said device may be obtained. One technique that has been proposed by the prior art to overcome the aforementioned defect inherent in rate mode operation is described in U.S. Pat. application Ser. No. 47,238 filed on June 18, 1970 by the inventors of the instant invention. Another technique is described in U.S. Pat. application Ser. No. 107,029, now U.S. Pat. No. 3,652,942, filed on Jan. 18, 1971 by the same inventors.

It is therefore an object of the present invention to provide a method of and apparatus for controlling the operation of a device wherein compensation of the reset mode of operation may be obtained without resort to a rate mode of operation.

It is another object of this invention to provide a method of and apparatus for reducing the fluctuations in the operation of a device, the operation of which is regulated by a control system.

A further object of this invention is to provide a method of and apparatus for rapidly stabilizing the performance of a device that is operable on a process variable in accordance with a predetermined standard of performance.

Yet another object of this invention is to provide a method of and apparatus for reducing the fluctuations in the transient response of a control system.

Still another object of this invention is to provide a method of and apparatus for reducing the fluctuations in a process control signal that is utilized to adapt the actual performance of a process to conform with a desired performance.

It is another object of the present invention to provide apparatus for use in combination with a process control system for reducing performance fluctuations about a desired standard of performance which performance fluctuations are caused by the operation of reset means included in said process control system.

Various other objects and advantages of the invention will become clear from the following detailed description of an exemplary embodiment thereof and the novel features will be particularly pointed out in connection with the appended claims.

In accordance with the present invention, a method of rapidly stabilizing the operation of a device to conform with a predetermined standard of performance by reducing the fluctuations in the operation of said device, and the apparatus therefor, are provided wherein a first signal proportional to an error signal characerizing the operation of said device is combined with a second signal proportional to the integral of said error signal and a third signal proportional to the inverse of said second signal and having a time delay with respect to said second signal; the combined signals being adapted to control the operation of said device in a manner such that said error signal is minimized.

Figure 2A:
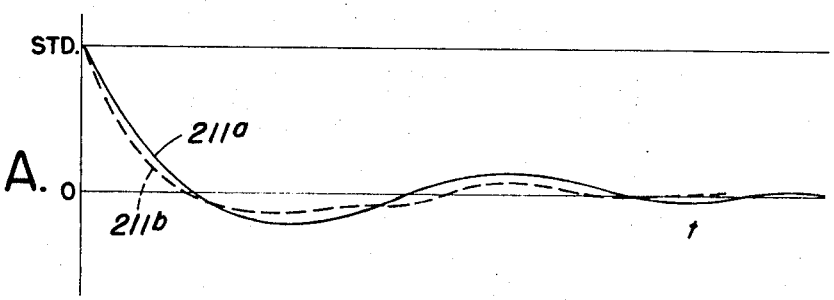
Figure 2B:
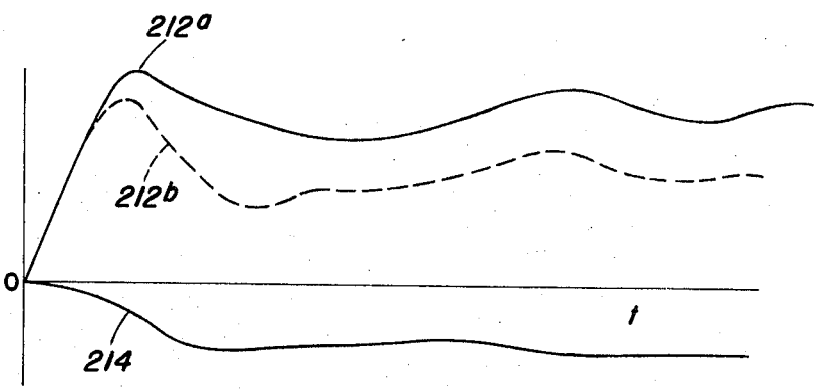
Figure 2C:
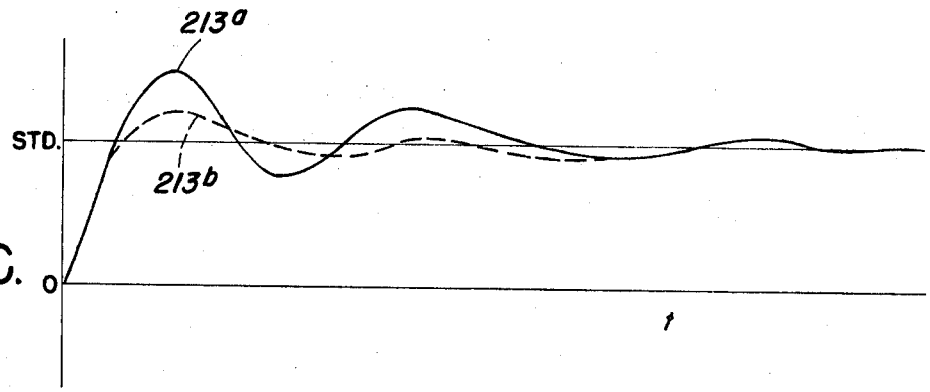

The invention will be more clearly understood by reference to the following detailed description of an exemplary embodiment thereof in conjunction with the accompanying drawings in which:

FIG. 1 illustrates in schematic and block form the apparatus of the present invention; and FIGS. 2a – 2c are graphical representations of voltage waveforms present at various locations of the apparatus illustrated in FIG. 1.

Referring now to the drawings, and in particular to FIG. 1, there is illustrated an exemplary embodiment of the apparatus that may be utilized in accordance with the present invention, comprising operating device 15, error detecting means 10, proportional mode operating means 11, reset mode operating means 12, combining means 13 and inverse time delay means 14. Operating device 15 may be an electrical device, a mechanical device, an electro-mechanical device, a processing plant, or a fluidic device adapted to vary its operation in accordance with a control signal applied thereto. Illustrative devices may include an electrical amplifier, a speed controlled motor, a pressure or temperature controlled processing system, a mechanical balancing device, a chemical or industrial processing plant or the like. It is of course apparent that the foregoing devices are merely illustrative and are not intended to limit the precise nature of the operating device 15 thereto. Each of the foregoing devices as well as other devices not mentioned herein are characterized by modifiable operation dependent upon a manipulatable variable. Operating device 15 is coupled to sensing means 16 which is adapted to sense the actual operation of the device 15. Sensing means 16 may comprise a conventional transducer such as a strain gauge, a tachometer, a thermocouple or the like for providing an electrical signal representative of the operation of device 15.

Sensing means 16 is coupled to error detecting means 10 which is adapted to compare the actual operation of device 15 with a desired standard of performance therefor and to detect differences therebetween. Accordingly, an electrical manifestation of said desired standard of performance is provided by reference means 101 which is coupled to error detecting means 10. The manifestation provided by reference means 101 is commonly referred to as a set point. Error detecting means 10 may include resistance means 102 and 103 coupled to a common junction whereat an error signal that is a function of the difference between the signals applied to resistance means 102 and 103 may be produced. Accordingly, the last-mentioned signals may admit of opposite polarities. Alternatively, error detecting means 10 may comprise a conventional differential amplifier including a first input terminal connected to sensing means 16 and a second input terminal connected to reference means 101 and adapted to produce an error signal proportional to the difference between the signals applied to said first and second input terminals.

Error detecting means 10 is coupled to proportional mode operating means 11 which is capable of providing a signal at the output thereof that is proportional to the generated error signal applied thereto. Proportional mode operating means 11 may comprise a conventional amplifying means such as an operational amplifying means 111 and variable feedback resistance means 112. It is appreciated by those of ordinary skill in the art that the gain of amplifying means 111 is dependent upon the effective resistance of variable feedback resistance means 112. Hence variable feedback resistance means 112 may comprise a conventional adjustable resistor such as rheostat means, potentiometer means, or the like. Alternatively, proportional mode operating means 11 may comprise amplifying means having an amplification factor dependent upon the biasing thereof. It is of course understood that error detecting means 10 and proportional mode operating means 11 may be combined in a single conventional circuit. Accordingly, subsequent reference to the error detecting means and the proportional mode operating means will be understood to be applicable to the individual circuits illustrated in FIG. 1 and to a single combined circuit not illustrated.

Proportional mode operating means 11 is coupled via led 113 to combining means 13. In addition, the output of proportional mode operating means 11 is coupled to reset mode operating means 12. The reset mode operating means 12 may comprise a conventional integrating circuit including operational amplifying means 121, input resistance means 122 coupled to said operational amplifying means 121 and feedback capacitance means 122 interconnecting the output terminal of operational amplifying means 121 with the input terminal thereof. The reset mode operating means 12 is adapted to produce a signal proportional to the integral of the signal supplied thereto. Although FIG. 1 illustrates that the signal supplied to the reset mode operating means 12 is derived from the proportional mode operating means 11, it will soon be understood that said signal may be supplied directly thereto by error detecting means 10. Consequently, the input terminal of reset mode operating means 12 may be connected in common relationship with the input terminal of proportional mode operating means 11, the common junction thus formed being connected to error detecting means 10. As shown in the drawings, input resistance means 122 of reset mode operating means 12 may comprise a variable resistance means for adjusting the effective time constant of said reset mode operating means 12.

The output of reset mode operating means 12 is connected to combining means 13 and in addition to inverse time delay means 14. Inverse time delay means 14 is adapted to apply a negative gain to a signal applied thereto and to add a time delay to said applied signal. The negative gain provided by said inverse time delay means 14 may be obtained from a negative gain amplifying means comprised of operational amplifier means 141, input resistance means 142 coupled to the operational amplifying means 141 and feedback resistance means 143 interconnecting the output terminal of operational amplifying means 141 with the input terminal thereof. Operational amplifying means 141 may be a conventional operational amplifier having a gain equal to $-R_{143}/R_{142}$ wherein $R_{143}$ is equal to the resistance of the feedback resistance means 143 and $R_{142}$ is equal to the resistance of input resistance means 142. Alternatively, operational amplifying means 141 may be an operational amplifier having an inverting input terminal and a non-inverting input terminal as is well known by those of ordinary skill in the art. In this case, input resistance means 142 may be connected to the inverting input terminal of operational amplifier means 141 and the non-inverting input terminal of said operational amplifying means may be coupled to a reference potential such as ground. The gain of operational amplifying means 141 would thus be equal to $-R_{143}/R_{142}$. Input resistance means 142 and feedback resistance means 143 are illustrated as variable resistance means such that the amplification factor of operational amplifying means 141 may be adjusted by adjusting either or both of said resistance means. It will soon become apparent from the further description set forth below that the amplification factor of operational amplifying means 141 is preferably less than unity. Accordingly, the resistance $R_{142}$ of input resistance means 142 should be adjusted to be greater than the resistance $R_{143}$ of feedback resistance means 143. Alternatively, the negative gain amplifying means may be replaced by attenuating means capable of inverting the polarity of the signal supplied thereto. Hence, a proposed attenuating means may comprise a conventional potentiometer connected to a phase or polarity inverting circuit such as a conventional inverting buffer having unity gain. It is of course recognized that various other amplifying and attenuating circuits well known to those of ordinary skill in the art may be utilized as the requisite negative gain amplifying means.

FIG. 1 illustrates that the output of the negative gain amplifying means is applied to time delay means. The time delay means is preferably a first order lag circuit which may be comprised of the series combination of resistance means 145 and capacitance means 146. Resistance means 145 is preferably a variable resistance means similar to the variable resistance means comprising input resistance means 122 of reset mode operating means 12.

The resistance of each of resistance means 145 and 122 are adapted for simultaneous adjustment for a purpose soon to be described. It is of course understood that can adjustment of resistance means 145 in effective to vary the time delay applied by the illustrated time delay means to a signal supplied thereto. The present invention contemplates various other embodiments of adjustable time delay means and is not to be limited merely to the illustrated series combination of resistance means 145 and capacitance means 146. For example, various adjustable lag circuits and time delay circuits such as those described in the Handbook of Operational Amplifier Applications published in 1963 by the Burr-Brown Research Corporation may be utilized. Other conventional time delay means may be employed herein, if so desired. In addition, the illustrated negative gain amplifying means and time delay means may be combined in a single circuit similar to those described in the aforementioned publication.

The output of the time delay means, here illustrated as the junction of resistance means 145 and capacitance means 146, is connected to combining means 13. Combining means 13 is capable of algebraically combining each of the signals applied thereto. Accordingly, combining means 13 may comprise a conventional summing circuit including operational amplifying means 131, input resistance means 132, 133 and 134, and feedback resistance means 135. Input resistance means 132 is connected to proportional mode operating means 11 by lead 113 and is effective to couple the proportional mode operating means 11 to operational amplifying means 131. Similarly, input resistance means 133 couples reset mode operating means 12 to operational amplifying means 131. In like manner, input resistance means 134 couples inverse time delay means 14 to the operational amplifying means 131. If the resistances of each of resistance means 132 - 135 are equal, the combining means will be characterized by unity gain. Various weighting factors may be introduced if desired by changing the resistance of said resistance means. The gain of combining means 13 may likewise be altered. The combining means 13 is coupled to operating device 15 whereby a control signal generated by the combining means may be utilized to modify the operation of device 15. Accordingly, combining means 13 may be coupled to a conventional final control element such that a manipulatable variable is regulated by said final control element in accordance with the control signal supplied thereto.

The operation of the apparatus illustrated in FIG. 1 will now be described in conjunction with the waveforms diagrammatically represented in FIGS. 2a – 2c. Sensing means 16 senses the actual operation of device 15 and supplies error detecting means 10 with a signal indicative of said actual operation. Error detecting means 10 is additionally supplied with a reference signal representative of a desired standard of performance and provided by reference means 101. Accordingly, error detecting means 10 operates in a well-known manner to supply proportional mode operating means 11 with an error signal representing a difference between the actual operation of device 15 and a desired operation thereof. Proportional mode operating means 11 amplifies the generated error signal. If the resistance of resistance means 102 is equal to the resistance of resistance means 103 it is seen that the gain of the proportional mode operating means 11 is determined by the effective resistance of adjustable feedback resistance means 112. Accordingly, the magnitude of the error signal may be increased by properly adjusting resistance means 112. Hence, the sensitivity of the control system illustrated in FIG. 1 may be adjusted for particular applications of the present invention merely by varying the gain of proportional mode operating means 11, until the desired result obtains. If the signal produced by sensing means 16 is assumed, for purposes of explanation, to be a step input signal, the signal produced by proportional mode operating means 11 in response thereto is illustrated in FIG. 2a as the solid curve 211a. It is of course understood that the signal produced by proportional mode operating means 11 is proportional to the error signal supplied by error detecting means 10. Since the device 15 cannot respond instantaneously to the control signal supplied thereto so as to operate in conformity with the desired standard of performance, an error signal, albeit decreasing in magnitude as the device is driven to operate in accordance with said standard of performance, will be produced for a finite interval of time. In addition, as is known from the prior art, the device 15 will operate in its steady state mode in response to the control signal supplied thereto after an initial transient period during which the operation of said device fluctuates about the steady state level. The error signal produced by error detecting means 10 will exhibit corresponding fluctuations as will the signal produced by proportional mode operating means 11 and illustrated as curve 211a. It is understood therefore, that when curve 211a obtains a zero value, the actual operation of device 15 corresponds to the desired operation thereof.

The amplifier error signal is applied to the reset mode operating means 12 whereat said amplified error signal is integrated. It is of course readily apparent that the error signal produced by error detecting means 10 may be applied directly to the reset mode operating means 12. The solid curve 212a illustrated in FIG. 2b represents the integrated signal produced by the reset mode operating means 12. As is well known to those of ordinary skill in the art when the curve 211a obtains a zero value, the curve 212a exhibits a maximum or minimum value. Consequently, the fluctuations in the signal produced by proportional mode operating means 11 are correspondingly produced by the reset mode operating means 12. Moreover, the inherent time delay and operating characteristics of the reset mode operating means results in a continuation of the fluctuations in the signal produced thereby after the fluctuations in the signal supplied thereto have subsided. Consequently, if the control signal supplied to device 15 includes a proportional mode component produced by proportional mode operating means 11 and a reset mode component produced by reset mode operating means 12 the resulting control signal could appear similar to the solid curve 213a illustrated in FIG. 2b. The fluctuations in the control signal are attributable mainly to the fluctuations in the integrated signal and tend to produce corresponding fluctuations in the operation of device 15 about the desired operation therefor. It is therefore a feature of the present invention to minimize the fluctuations in the integrated signal, thereby stabilizing said integrated signal at its steady state value.

The integrated signal is supplied to inverse time delay means 14 whereat said signal is attenuated, inverted, and a time delay is added thereto. If the negative gain amplifying means illustrated in FIG. 1 is included in the inverse time delay means 14, the signal produced by said negative gain amplifying means may be represented by a mirror image of curve 212a having an attenuated magnitude. The time delay added to such inverted signal by the series combination of resistance means 145 and capacitance means 146 results in a signal that may be graphically represented by the solid curve 214 of FIG. 2b. It is of course understood that if inverse time delay means 14 includes a single circuit capable of performing an inverting, attenuating, delaying function, the resulting signal produced thereby would also be illustrated by the solid curve 214. If the signal produced by proportional mode operating means 12 would be combined with the signal produced by inverse time delay means 14, as by algebraically summing said signals, the resulting signal would conform to the broken curve 212b illustrated in FIG. 2b. A combination of said resulting signal and the signal produced by proportional mode operating means 11 results in a control signal represented by the broken curve 213b illustrated in FIG. 2c. It is readily observed that the fluctuations of curve 213b are much reduced from the fluctuations of curve 213a and the former curve is rapidly stabilized at its steady state value. Thus, fluctuations in the control signal applied to device 15 are substantially reduced, and performance fluctuations of device 15 are correspondingly reduced. Hence, device 15 obtains its stable steady state operation in a minimum amount of time.

The signals produced by proportional mode operating means 11, reset mode operating means 12 and inverse time delay means 14 are illustrated as being simultaneously combined by combining means 13. It is of course understood that this is equivalent to combining the signal produced by reset mode operating means 12 and inverse time delay means 14 to generate a resulting signal and to combine said resulting signal with the signal produced by proportional mode operating means 11 to generate the control signal. Alternatively, a resultant signal may be obtained by combining the signal produced by proportional mode operating means 11 with the signal produced by reset mode operating means 12. Said resultant signal may then be combined with the signal produced by inverse time delay means 14 to generate the control signal. Accordingly, a plurality of combining means to effect the aforementioned operations may be provided. Moreover, the combining means 13 illustrated in FIG. 1 as a conventional algebraic summing amplifier, may be replaced by a conventional adder subtractor network wherein the signals supplied to resistance means 132 and 133, respectively, are added, and the signal supplied to resistance means 134 is substracted from the added signals. In this modification of the present invention, it is appreciated that inverse time delay means 14 need not include a negative gain amplifier since the modified combining means 13 would perform the requisite subtracting operation. In addition, the aforementioned attenuating operation performed by the previously described negative gain amplifying means would be effected by the series combination of resistance means 145, capacitance means 146 and resistance means 134. The degree of attenuation may be determined by the resistance of resistance means 134.

Adjustable resistance means 122 and 145 are adapted for simultaneous adjustment such that a variation in the time constant of reset mode operating means 12 results in a compensating adjustment in the time delay provided by inverse time delay means 14. Accordingly, the adjustable resistance means 122 and 145 may comprise ganged potentiometers, ganged rheostats or other simultaneously adjustable resistance means. It is seen therefore, that the control system in accordance with the present invention may be matched to the particular characteristics of device 15 without requiring an additional adjustment of an independent variable.

The negative gain amplifying means illustrated in FIG. 1 is provided with adjustable resistance means 142 and 143 to vary the attenuating factor thereof. It is preferred that the signal provided by inverse time delay means 14 exhibit a magnitude that is approximately 25 to 35 percent of the magnitude of the signal produced by reset mode operating means 12. Accordingly, the gain of the negative gain amplifying means, or the attenuating factor of the inverse time delay means 14, may be adjusted to provide optimum damping of the fluctuations included in the control signal produced by combining means 13, thereby minimizing fluctuations in the operation of device 15. It should be appreciated therefore, that if desired, resistance means 134 may comprise an adjustable resistor to permit further modification in the magnitude of the signal produced by inverse time delay means 14.

As the apparatus illustrated in FIG. 1 regulates the operation of device 15, the reduced fluctuations of the control signal produced by combining means 13, and illustrated as curve 213b, tend to rapidly stabilize the operation of device 15 to thereby minimize the error signal produced by error detecting means 10. Stabilization of the device 15 results in a reduction in the fluctuations of the error signal, and the signal produced by proportional mode operating means 11 may now be represented by the broken curve 211b of FIG. 2a. Thus it is seen that the fluctuations in the proportional mode component of the control signal, which heretofore contributed to the objectionable transient operation of device 15, have been substantially reduced. Consequently, the reset mode component of the control signal, represented as curve 212a, exhibits a further reduction in the fluctuations thereof whereby the transient response of device 15 evinces a further improvement. It should now be appreciated that the present invention features a closed loop feedback control system having dynamic characteristics that are readily adjusted to match the particular operating characteristics of a controlled device or process whereby said controlled device or process rapidly achieves a stabilized operation.

While the invention has been particularly shown and described with reference to a specific embodiment thereof, it will be obvious to those of ordinary skill in the art that the foregoing and various other changes and modifications in form and details may be made without departing from the spirit and scope of the invention. It is therefore intended that the appended claims be interpreted as including all such changes and modifications.

What is claimed is:

1. A method of reducing the fluctuations in the operation of a device wherein said device operates on a process variable in accordance with a predetermined standard of performance, comprising the steps of:
    determining a difference between the actual operation of said device and said predetermined standard of performance;
    providing a representation proportional to the time integral of said difference;
    inverting said representation and adding a time delay thereto;
    combining said difference, said representation and said inverted time delayed representation; and
    altering the operation of said device in accordance with said combined difference, representation and inverted time delayed representation in a manner such that said actual operation of said device tends to conform to said predetermined standard of performance.

2. The method of claim 1 wherein said step of determining a difference comprises the step of comparing the actual operation of said device with said predetermined standard of performance.

3. A method of rapidly stabilizing the operation of a device wherein said device operates on a process variable in accordance with a predetermined standard of performance, comprising the steps of:
    determining a difference between the actual operation of said device and said predetermined standard of performance;
    providing an indication of the time integral of said difference;
    modifying said indication with a time delayed representation thereof;
    combining said difference and said modified indication; and
    altering the operation of said device in accordance with said combined difference and modified indication in a manner such that said actual operation of said device tends to conform to said predetermined standard of performance.

4. The method of claim 3 wherein said step of modifying comprises the step of subtracting an attenuated time delayed representation of said indication from said indication.

5. The method of claim 4 wherein said step of subtracting comprises the steps of:
    attenuating said indication;
    inverting said attenuated indication;
    adding a time delay to said inverted indication; and
    algebraically combining said inverted time delayed indication and said indication.

6. A method of reducing the fluctuations in a process control signal, said process control signal including a proportional mode component indicative of the difference between the actual performance of a process and a predetermined standard of performance, and a reset mode component indicative of the integral of said difference, comprising the steps of:
    inversely attenuating said reset mode component;
    adding a time delay to said inverted reset mode component; and
    combining said inverted time delayed reset mode component, said proportional mode component and said reset mode component.

7. A control system for regulating the operation of a device in accordance with a desired standard of performance, comprising;
    error detecting means for providing an error signal when the operation of said device deviates from said desired standard of performance;
    proportional mode operating means for producing a first signal proportional to said error signal;
    reset mode operating means for producing a second signal proportional to the integral of said error signal;
    inverse time delay means coupled to said reset mode operating means for producing a third signal proportional to the inverse of said second signal and having a time delay with respect to said second signal; and
    combining means coupled to said proportional mode operating means, said reset mode operating means and said inverse time delay means for combining said first, second and third signals to generate a control signal adapted to be applied to said device such that the operation of said device tends to conform to said desired standard of performance, thereby minimizing said error signal.

8. A control system in accordance with claim 7 wherein said inverse time delay means comprises;
negative gain amplifying means having an amplification factor less than unity; and
lag circuit means connected to said negative gain amplifying means for applying a time delay to the signal applied thereto by said negative gain amplifying means.

9. A control system in accordance with claim 8 wherein said lag circuit means includes adjustable means for adjusting the time delay applied thereby and said reset mode operating means includes corresponding adjustable means; said respective adjustable means being adapted for simultaneous adjustment thereof.

10. A control system in accordance with claim 8 wherein said negative gain amplifying means includes gain adjust means for adjusting said amplification factor to a desired value.

11. In combination with a process control system for regulating the performance of a process, said process control system including amplifying means and integrating means responsive to an error signal characterizing the performance of said process, apparatus for reducing performance fluctuations about a desired standard of performance caused by the operation of said reset means, comprising:
inverse time delay means connected to said integrating means for inverting and time delaying the signal produced by said integrating means; and
means for adding the signal produced by said inverse time delay means to the signals produced by said amplifying means and said integrating means, respectively, to generate a control signal adapted to regulate the performance of said process.

12. The combination of claim 11 wherein said inverse time delay means comprises:
negative gain amplifying means connected to said integrating means, said negative gain amplifying means having an amplification factor less than unity; and
time delay means connected to said negative gain amplifying means for adding a time delay to the signal produced by said negative gain amplifying means.

13. Apparatus for reducing fluctuations in the transient response of a control system including a proportional mode operating component and a reset mode operating component, comprising:
lag means coupled to said reset mode operating component for adding a time delay to the signal produced by said reset mode operating component and for inverting the delayed signal; and
combining means coupled to said proportional mode operating component, said reset mode operating component and said lag means for algebraically combining the signals produced by each of said components and the signal produced by said lag means.

* * * * *